US012756728B2

(12) United States Patent
Gechman et al.

(10) Patent No.: US 12,756,728 B2
(45) Date of Patent: Oct. 6, 2026

(54) DETECTION OF CRYPTOCURRENCY MINING TRAFFIC

(71) Applicant: Mellanox Technologies, Ltd., Yokneam (IL)

(72) Inventors: Vadim Gechman, Kibbutz Hulda (IL); Haim Elisha, Ashkelon (IL); Nir Rosen, Pardes Hana-Karkur (IL); Chen Rozenbaum, Beer Yakov (IL); Ahmad Saleh, Rina Village (IL); Muhammad Abu Saleh, Nahef (IL); Emil Khshiboun, Kafr Kanna (IL)

(73) Assignee: Mellanox Technologies Ltd., Yokneam (IL)

( * ) Notice: Subject to any disclaimer, the term of this patent is extended or adjusted under 35 U.S.C. 154(b) by 184 days.

(21) Appl. No.: 18/479,229

(22) Filed: Oct. 2, 2023

(65) Prior Publication Data

US 2024/0223588 A1 Jul. 4, 2024

(30) Foreign Application Priority Data

Dec. 28, 2022 (IL) .......................................... 299558

(51) Int. Cl.
*H04L 9/40* (2022.01)
*H04L 41/16* (2022.01)

(52) U.S. Cl.
CPC .......... *H04L 63/1425* (2013.01); *H04L 41/16* (2013.01); *H04L 63/145* (2013.01)

(58) Field of Classification Search
CPC .... H04L 63/1425; H04L 41/16; H04L 63/145
See application file for complete search history.

(56) References Cited

U.S. PATENT DOCUMENTS

| | | | | |
|---|---|---|---|---|
| 2017/0353477 | A1* | 12/2017 | Faigon | G06F 21/6209 |
| 2020/0014712 | A1* | 1/2020 | Gusat | H04L 45/08 |
| 2021/0084060 | A1* | 3/2021 | Garg | H04L 63/1466 |
| 2022/0300394 | A1* | 9/2022 | Webber | H04L 67/104 |
| 2023/0006889 | A1* | 1/2023 | Thyagaturu | H04L 41/5054 |
| 2023/0011397 | A1* | 1/2023 | Panse | H04L 63/20 |
| 2023/0199005 | A1* | 6/2023 | Kwon | H04L 63/1416 726/23 |
| 2023/0344863 | A1* | 10/2023 | Shashivasan | H04L 63/1433 |
| 2024/0045958 | A1* | 2/2024 | Bunin | G06F 21/566 |
| 2024/0406274 | A1* | 12/2024 | Courvoisier | H04L 67/146 |

OTHER PUBLICATIONS

Huang et al., "Cryptomining Traffic Detection Based on BiGRU and Attention Mechanism," 2023 7th International Conference on Cryptography, Security and Privacy (CSP) Year: 2023 | Conference Paper | Publisher: IEEE.*

Hu et al., "Detecting Cryptomining Traffic Over an Encrypted Proxy Based on K—S Test," ICC 2023—IEEE International Conference on Communications Year: 2023 | Conference Paper | Publisher: IEEE.*

NVIDIA DOCA Flow Inspector Service; Guide, MLNX-15-060530_v2.2.0; published Aug. 2023.

NVIDIA DOCA Telemetry Service; Guide, MLNX-15-060509_v2.2.0; published Aug. 2023.

* cited by examiner

*Primary Examiner* — Roderick Tolentino
(74) *Attorney, Agent, or Firm* — PEARL COHEN LLP

(57) ABSTRACT

A system and method may detect crypto mining, including using a processor: obtaining a stream of packets; extracting metadata of the packets; and determining whether the packets are related to crypto mining by providing the metadata of the packets to a machine learning (ML) model.

20 Claims, 5 Drawing Sheets

DETECTION OF CRYPTOCURRENCY MINING TRAFFIC

PRIOR APPLICATION DATA

The present application claims priority from prior Israel patent application number 299558 filed on Dec. 28, 2022, entitled "SYSTEMS AND METHODS FOR DETECTION OF CRYPTOCURRENCY MINING TRAFFIC USING PACKET METADATA", incorporated by reference herein in its entirety.

FIELD OF THE INVENTION

The present invention relates generally to determining the use of a computer system or network; by way of non-limiting example, if a network is being used improperly to convey traffic related to cryptocurrency mining instead of other types of traffic.

BACKGROUND

Cryptocurrency mining, also referred to as crypto mining, may allow an entity to earn units of cryptocurrencies (e.g. the Bitcoin, Ethereum, or Monero cryptocurrencies) as a reward for solving complex mathematical and computational problems.

A data center may include many computer processors executing disparate computer processes operated, controlled, or "owned" by remote entities, which may be customers of the data center. Entities may purchase bandwidth from a data center. Many different entities may have processes (e.g. NN execution, graphics processing, etc.) executing at a data center at the same time.

Some processes executed at a data center may be permitted (e.g. by data center policies) and others may be not permitted, or undesirable. Malicious entities may misuse data center compute or other resources by executing applications prohibited by the data center, for example resulting in downtime and higher operating costs. An entity may hijack or hack processors at a data center to execute processes to mine cryptocurrencies. Hackers may cryptojack processors by, for example, infecting enterprise infrastructure with crypto mining software.

SUMMARY

According to embodiments of the invention, a computer-based system and method for detecting crypto mining may include obtaining a stream of packets, extracting metadata of the packets; and determining whether the packets are related to crypto mining by providing the metadata of the packets to a machine learning (ML) model. According to embodiments of the invention, the ML model may be trained to detect crypto mining.

Embodiments of the invention may include training the ML model to detect crypto mining by providing the ML model with training streams of packets, each labeled as related to crypto mining or not related to crypto mining.

According of embodiments of the invention, the stream of packets may include a sequence of consecutive packets of a Transmission Control Protocol (TCP)/Internet protocol (IP) connection.

According of embodiments of the invention, the ML model may include a neural network (NN).

According of embodiments of the invention, the ML model may include a long short-term memory (LSTM) neural network (NN).

According of embodiments of the invention, for each of the packets, the metadata may be selected from: source Internet protocol (IP) address and port, destination IP address and port, packet size, packet direction, latency between 2 consecutive packets, and at least one Transmission Control Protocol (TCP) flag of the packet, and the at least one TCP flag may be selected from: Synchronization (SYN), Acknowledgement (ACK), Finish (FIN), Reset (RST), Push (PSH) and Urgent (URG).

According of embodiments of the invention, obtaining the group of packets may include: mirroring a plurality of packets flowing in a computer network, organizing the metadata of the plurality of packets in queues based on the metadata, wherein each queue comprises metadata of consecutive packets of a single stream, and providing the metadata of consecutive packets in a single queue to the ML model.

According of embodiments of the invention, the queues may be updated using a first-in-first-out (FIFO) policy.

Embodiments of the invention may include providing a report of the packets that are related to crypto mining.

According to embodiments of the invention, a computer-based system and method for detecting crypto mining in a computer network may include: mirroring a plurality of packets flowing in the computer network, extracting features of each of the plurality of packets, organizing the features of the plurality of packets in flows based on the features, and detecting the crypto mining activity by providing the features of packets pertaining to a single flow to a machine learning (ML) model. According to some embodiments, the ML model may be trained to detect crypto mining.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanying drawings. Embodiments of the invention are illustrated by way of example and not limitation in the figures of the accompanying drawings, in which like reference numerals indicate corresponding, analogous or similar elements, and in which:

Figure 1:
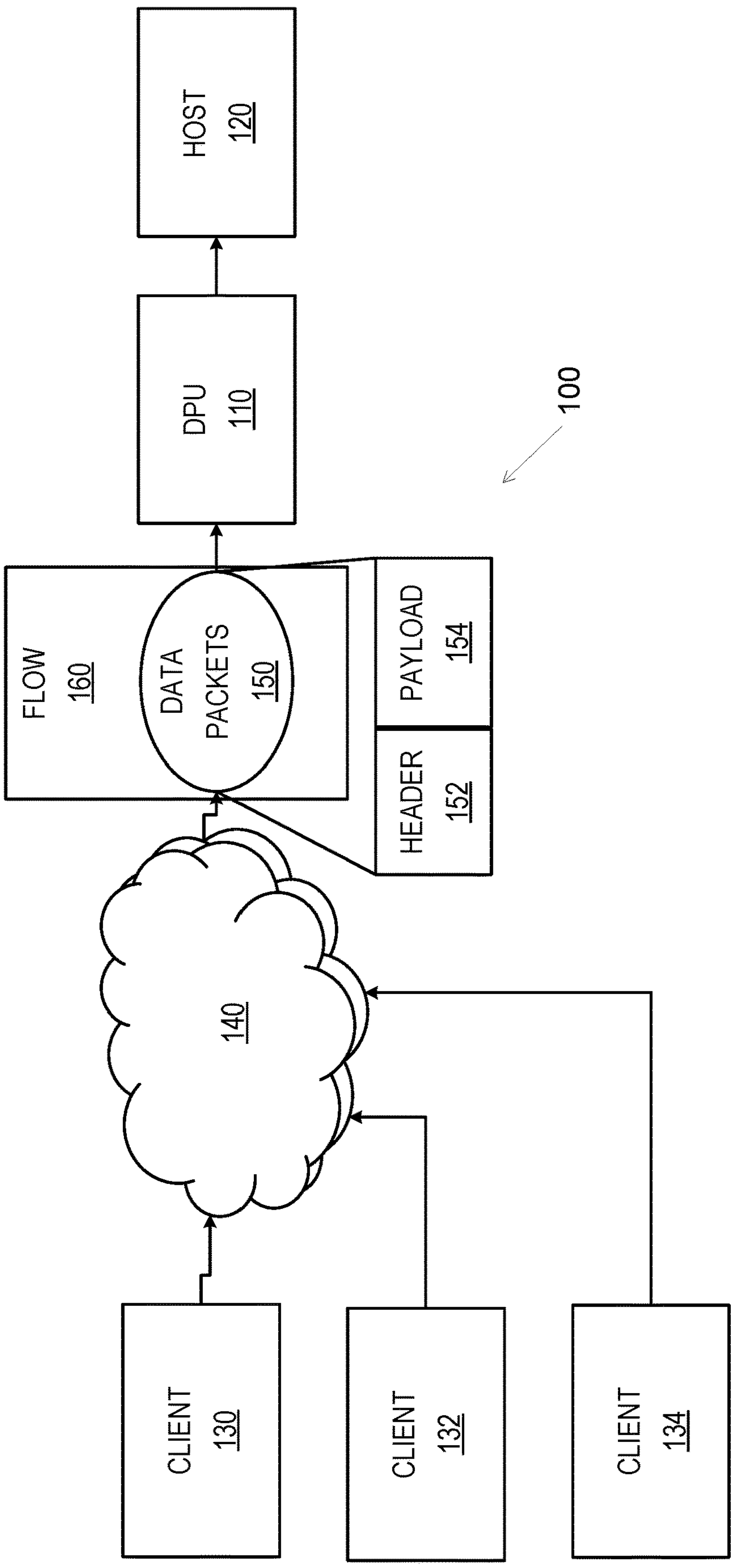
FIG. 1 depicts a system for executing processes, according to embodiments of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention may monitor network traffic, captured for example using a data processing unit (DPU) or a smart network interface card (NIC) operating in data centers (e.g., cloud computing centers). The network traffic may be analyzed, and metadata may be derived from data packets, e.g. source Internet protocol (IP) address and port, destination IP address and port, packet size, packet direction, latency between two consecutive packets and at least one transmission control protocol (TCP) flag of the packet, etc. The metadata may be analyzed and a report or alert may be created, for example describing the likelihood that a network flow, stream or connection may be related to or generated by prohibited or undesirable activity such as cryptocurrency mining or cryptocurrency processing (referred to herein collectively as "crypto mining"). An example cryptocurrency that may be for example maliciously or otherwise mined contrary to a policy (e.g. by mistake) is the Etherium cryptocurrency. crypto mining of Etherium and other cryptocurrencies may be detected. The prohibited network traffic may be transmitted to a cloud computing center in violation of a policy of the entity owning the cloud computing center, e.g. via cryptojacking or malicious crypto mining, and without the entity owning the cloud computing center knowing that cryptocurrency processing is taking place, and possibly without the entity external to the data center (e.g. the customer) which is requesting that a legitimate process be executed knowing its processes have been hijacked for a use other than intended by that entity.

While data centers are discussed herein, other installations of processors may also be monitored. While a targeted undesirable or prohibited process as discussed herein is cryptocurrency mining, other undesirable processes may be monitored. Which class of traffic, e.g. desirable/undesirable, cryptocurrency mining, etc., being transmitted on the network, may be determined, or the likelihood or probability of such execution may be determined. Metadata such as source IP address and port, destination IP address and port, packet size, packet direction, latency between two consecutive packets and at least one TCP flag of the packet, etc. may be extracted from data packets in the network. The metadata, or a subset of the metadata, may be provided to a machine learning (ML) model process, such as a neural network (NN), a recurrent neural network (RNN), a long short-term memory (LSTM) model, etc. (e.g., model 230 in FIG. 2). The ML model may input the data and provide a classification or likelihood that a certain flow is in a certain class, e.g. carrying data related to a certain type of cryptocurrency mining process.

A network flow or stream may refer to a plurality of packets including segments of a single data block sent by an application. For example, the application level in the client side may send the block of data to a TCP layer in the client side. The TCP layer may segment the data block into segments, e.g., protocol data units (PDUs), and send the segments in data packets over a connection to the host. Thus, in some embodiments, a flow or stream may refer to a TCP/IP connection.

An RNN is a class of artificial neural networks which uses sequential data or time series data. In RNNs, connections between nodes can create a cycle, allowing output from some nodes to affect or be used as subsequent input to the same nodes e.g., information from prior inputs may influence the current input and output. Thus, RNNs may have internal state (memory) that may make them suitable for processing sequences of inputs or time series data. LSTM networks are a modified version of RNNs that are capable of learning long-term dependencies.

In one embodiment, an RNN or LSTM may be trained by providing the ML model with training flows or streams of packets, each labeled before training with the correct output, e.g., the class of process (e.g., crypto mining; not crypto mining).

For a training dataset, the data packets known to be related or not related to crypto mining may be labelled or tagged, e.g., by a human, and used for training purposes. For example, streams, or metadata of streams, known to be related to cryptocurrency mining may be labelled "cryptocurrency mining" and other streams may be labeled "not crypto" or other suitable labels. This may be used for training, testing and validations of ML models. Validation data may be mixed labelled data which is classified according to an ML model, and which has not been used to train or test the model. This helps to validate an ML model, and to ensure the model is not overfitted to specific data.

At inference, data for a specific network traffic, e.g., a set or vector of metadata of a plurality of packets pertaining to a stream, flow or connection, may be provided to the ML model, and a prediction or decision (e.g., a vote) may be produced.

Reference is made to FIG. 1, depicting a system 100, according to embodiment of the invention. It should be understood in advance that the components, and functions shown in FIG. 1 are intended to be illustrative only and embodiments of the invention are not limited thereto.

Networks 140 may include any type of computer network or combination of networks available for supporting communication among clients 130, 132 and 134 and host 120 via DPU 110, also referred to as a smart NIC. Networks 140 may include for example, a wired, wireless, fiber optic, or any other type of connection, a local area network (LAN), a wide area network (WAN), the Internet and intranet networks, etc.

According to some embodiments, any one of clients 130, 132 and 134 may communicate with host 120, and host 120 may communicate with any one of clients 130, 132 and 134, for example, by generating and submitting streams or flows 160 of data to host 120. In one example, a stream or flow 160 of data transmitted from one of clients 130, 132 and 134 to host 120, may be or may include one or more data packets 150 each including a header 152 and a payload 154. The header 152 may include metadata such as source IP address and port, destination IP address and port, packet size, packet direction, a timestamp, and one or more TCP flags of the packet, etc. The one or more TCP flags may include for example Synchronization (SYN), Acknowledgement (ACK), Finish (FIN), Reset (RST), Push (PSH) and Urgent (URG). The payload 154 may include the packet data. While three clients 130, 132 and 134 and a single host 120 are shown in FIG. 1, one or more hosts 120 may provide computer services to one or more clients 130, 132 and 134 or client applications.

Data packets 150 may be streamed between clients 130, 132 and 134 and host 120 via network 140 and DPU 110. DPU or smart NIC 110 may be or may include a computing device (such as computing device 700 depicted in FIG. 7) including a processor (e.g., processor 705) and a NIC (e.g., network interface 750) adapted to connect host 120 to network 140, and optionally some programmable data acceleration engines (not shown). DPU 110 may capture, sniff or intercept one or more data packets 150 along the communication route between clients 130, 132 and 134 and host 120, without interfering with the communication of data packets 150 to host 120. DPU 110 may be located at one or more points along the communication route between clients 130, 132 and 134 and host 120 to monitor for and capture or intercept data packets 150 without requiring the participation of host 120, and without relying on any form of native auditing or native logs of host 120. While depicted at the host side of network 140, DPU 110 may intercept flows 160 at other locations such as, but not limited to, the client side, within network 340, etc. DPU 110 may analyze headers 152 to determine whether a stream 160 including data packets 150 associated with headers 152 is related to or generated by crypto mining activity or not. In some embodiments, DPU 110 may determine, based on the classification whether data packets 150 pertaining to a certain flow or a stream 160 should be blocked or should be allowed to flow to host 120. DPU 110 may issue a status report, a notice, an alarm or a warning, e.g., to a human user, in case crypto mining activity is suspected or detected.

Figure 2:
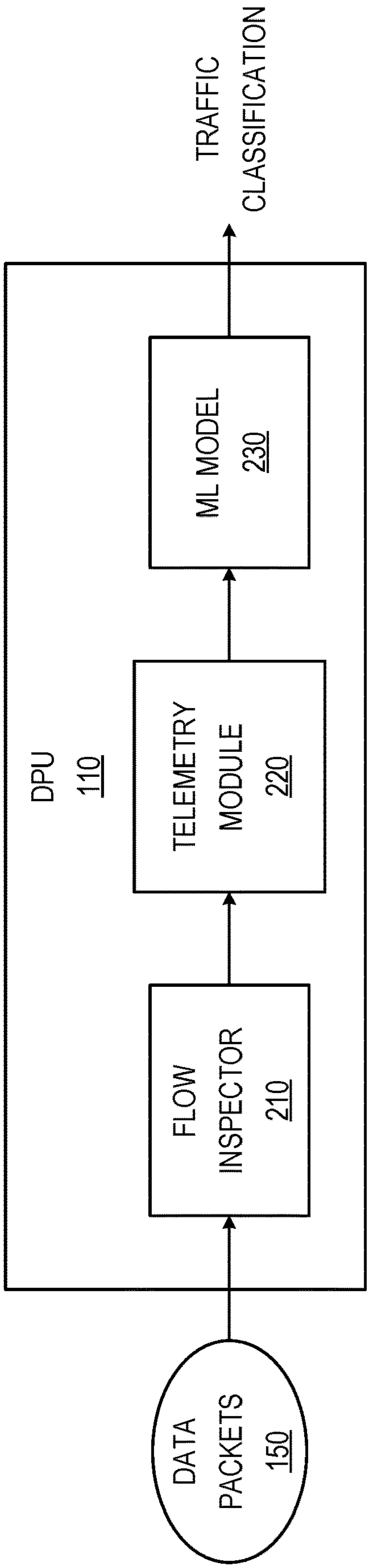
FIG. 2 depicts a high-level schematic diagram of a network interface card, according to embodiment of the invention.

Reference is made to FIG. 2, depicting a high-level schematic diagram of DPU 110, according to embodiment of the invention. According to embodiment of the invention DPU 110 may include flow inspector 210, telemetry service 220 and ML model 230. It should be understood in advance that the components, and functions shown in FIG. 2 are intended to be illustrative only and embodiments of the invention are not limited thereto. According to embodiments of the invention, the some or all of flow inspector 210, telemetry service 220 and ML model 230 may be implemented at or executed by host 120. However, including flow inspector 210, telemetry service 220 and ML model 230 may provide the advantage of offloading host 120 releasing processing power of host 120 to perform other operations. In some embodiments, telemetry service 220 may be or may include DOCA Telemetry Service (DTS) and flow inspector 210 may be or may include DOCA Flow Inspector receives.

According to embodiments of the invention, flow inspector 210 may capture or intercept a plurality of data packets 150 flowing between host 120 and clients 130, 132 and 134. According to embodiments of the invention, flow inspector 210 may receive mirrored packets, e.g., a copy of packets 150. Flow inspector 210 may capture both packets transmitted from any of clients 130, 132 and 134 to host 120 and packets transmitted from host 120 to any of clients 130, 132 and 134. Data packets 150 may be captured in real-time substantially without adding latency or delay. According to some embodiments, flow inspector 210 may decrypt or analyze captured data packets 150 to obtain a header 152 of each data packet 150. For example, flow inspector 210 may decrypt and parse the header 152 to extract or obtain header information, also referred to as metadata, including, for example, timestamp, host IP, data length (packet size), source media Access Control (MAC) address, destination MAC address, layer four (L4) protocol, source IP, destination IP, source port, destination port and TCP flags, etc. The TCP flags may include one or more of Synchronization (SYN), Acknowledgement (ACK), Finish (FIN), Reset (RST), Push (PSH) and Urgent (URG). After the extraction flow inspector 210 may forward the metadata to telemetry module 220, e.g., using inter process communication (IPC) socket.

Telemetry module 220 may collect metadata from flow inspector 210 and may forward the metadata to ML model 230. Flow inspector 210 may provide ML model 230 metadata of a sequence of consecutive packets 150 of a stream or flow 160 of packets 150, e.g., of a TCP/IP connection. The sequence of the packets (e.g., packets in a single queue) may be a fraction of those in the TCP/IP connection and may start from any packet in the TCP/IP connection. For example, the sequence of the packets (e.g., a queue of packets) may include 30, 40, 50, 60 or other number of packets 150 of a single flow, stream or connection 160. According to some embodiments, telemetry module 220 may organize the metadata of the plurality of packets 150 in queues based on the metadata, where each queue may include metadata of consecutive packets 150 of a single stream. Telemetry module 220 may determine to which queue or flow 160 a packet 150 belongs based, for example, on metadata of the packets, e.g., on the source IP address, source port, destination IP address and destination port of the packet. In one embodiment, telemetry module 220 may determine that packets 150 with the same source IP address, source port, destination IP address and destination port, may all pertain to the same flow or stream 160, and may aggregate those packets 150 at the same queue. Telemetry module 220 may generate a key for each stream or flow 160 that is analyzed, using, for example, the source IP address, source port, destination IP address and destination port of the packets 150, and aggregate metadata of the packets 150 to a specific queue using the key. In some embodiments, telemetry module 220 may organize the packets in a queue in consecutive order based on the timestamp of the packets included in the metadata of the packets 150. Other parameters and logic may be used to organize packets 150 in queues. In some embodiments, each queue may include a batch of packets in JavaScript object notation (JSON) format. Telemetry module 220 may provide the metadata of the consecutive packets in a single queue to the ML model 130. In some embodiments, the queues may be managed using FIFO policy, e.g., when a new packet 150 is added to a queue, the oldest packet in the queue is removed.

ML model 230 may obtain the queue of metadata of packets 150 from telemetry module 220. Although a single ML model 230 is presented in FIG. 2, it should be readily understood by those skilled int heart that DPU 110 may include multiple implementations of ML model 230 to analyses a plurality of queues in parallel, where each ML model 230 analyses a single queue. ML model 230 may be or may include any applicable type of classifier or learned model trained to detect crypto mining.

ML model 230 may enrich the metadata with features extracted or calculated using the metadata. For example, ML model 230 may calculate the latency between each two consecutive packets 150 in a flow 160 based on the timestamp of packets 150.

According to embodiments of the invention, ML model 230 may be trained by providing ML model 230 with training streams of metadata of packets, each labeled as related to crypto mining or not related to crypto mining. Training may include or may be followed by a validation stage. According to embodiments of the invention, patterns in metadata of crypto mining packets may be specific enough to differentiate crypto mining packets from traffic of other processes. Those patterns may be learned by ML model 230 during the training and validation phases, and the trained model 230 may be used in an inference stage to detect crypto mining activity directed to host 120. According to some embodiments, ML model 230 may be implemented in a dedicated docker or container.

Thus, embodiments of the invention may improve the technology of computer and data center management and monitoring by providing an efficient and real time method for detecting crypto mining activity. Since ML model 230 only requires metadata of packets 150, embodiments of the invention may detect crypto mining activity without parsing the data or payload 154 of packets 150, which may further improve the efficiency of detection, and may enable detection of crypto mining activity even if the data in packets 150 is encrypted. Computer systems other than data centers may be monitored by embodiments of the present invention.

According to some embodiments, ML model 230 may include an RNN, which is suitable for analyzing time series data as the queue of metadata. In some embodiments, variations of RNN may be use such as LSTM or gated recurrent units (GRU) models.

Figure 3:
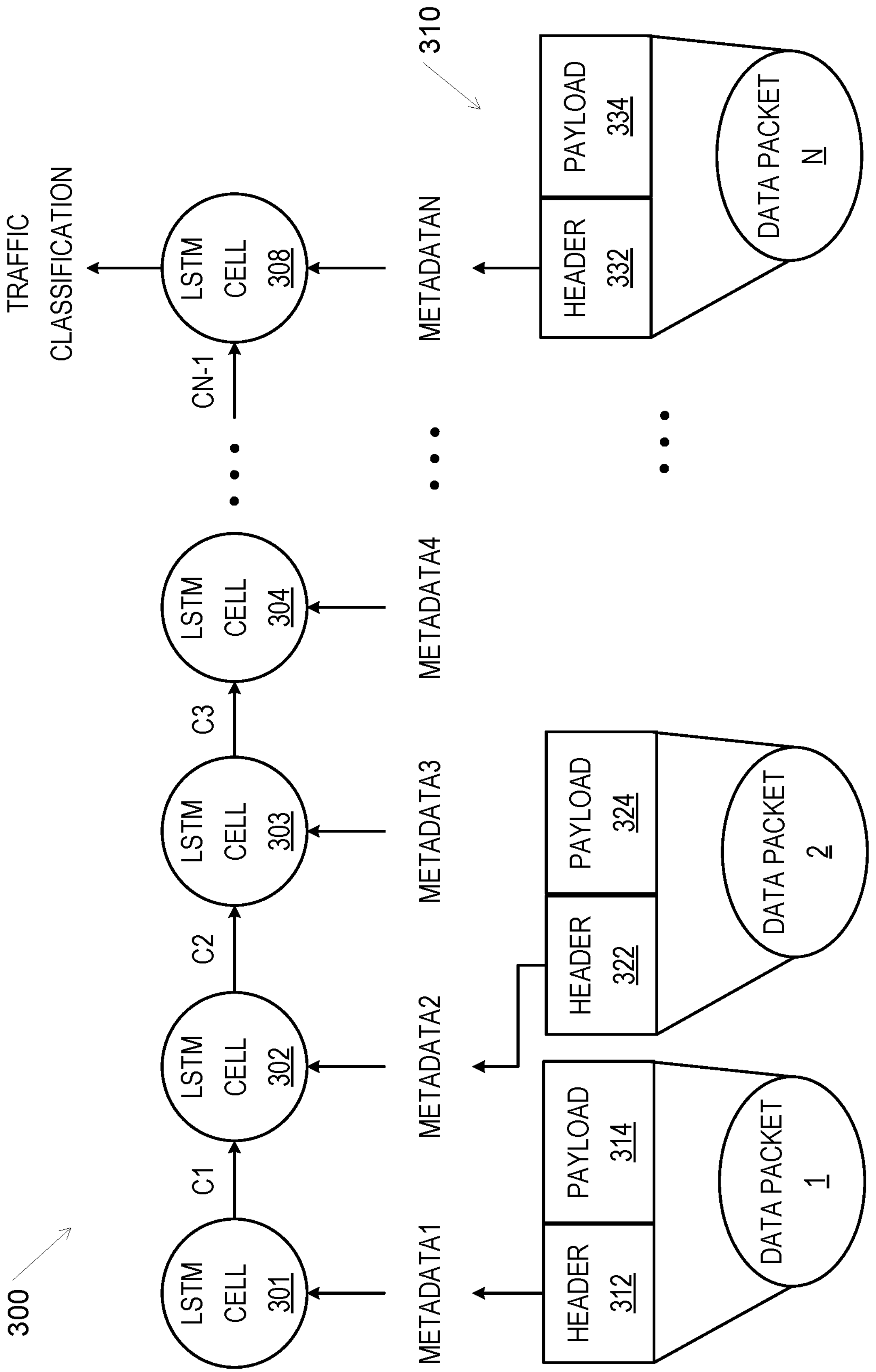
FIG. 3 depicts a schematic diagram of a long short-term memory (LSTM) model, according to embodiments of the invention.

Reference is now made to FIG. 3 which depicts a schematic diagram of an LSTM model 300, according to embodiments of the invention. LSTM model and LSTM cells are known in the art. According to embodiments of the invention, model 300 may include a plurality of LSTM cells 301-308. Other types of cells may be used, e.g., GRUs. In each computational cycle, each of LSTM cells 301 to 308 may obtain metadata METADATA1 to METADATAN of one of a series of consecutive packets 1 to N in a queue of packets 310, where N is the number of packets in a queue, e.g., N=30, 40, 50 etc. Each time a new packet of queue 310 is received by DPU 110, the queue is updated using FIFO policy, e.g., the oldest packet, e.g., data packet N, is removed from queue 310 and each of the remaining packets e.g., packets 1 to (N−1) is advanced in the queue, e.g., packet 1 becomes packet 2, packet 2 becomes packet 3, packet (N−1) becomes packet N, etc., and the new packet becomes packet 1. The metadata (including extracted parameters) of updated queue 310 may then be feed fed into model 300. In addition, as known in the art, each of LSTM cells 302-308 may obtain an output C1 to CN−1 produced by a previous cell, e.g., LSTM cell 302 may obtain output generated by LSTM cell 301, LSTM cell 303 may obtain output generated by LSTM cell 302, etc. LSTM model 300 may provide a classification, a grade, a score or a prediction indicating whether queue 310 is suspected as including crypto mining activity or not.

During a training stage, LSTM model 300 may be provided with labeled or tagged sequences of metadata, e.g., metadata extracted and/or calculated from queues 310 that are known as including crypto mining or not. The tagged sequences of metadata may be provided to LSTM model 300 which may provide a prediction. The prediction may be compared with the true label, and weights of LSTM model 300 may be updated based on the comparison in a back propagation process, as known in the art. Once trained, LSTM model 300 may be used for detecting crypto mining activity on real world data, e.g., metadata of queues of packets 150 transferred by DPU 110.

Figure 4:
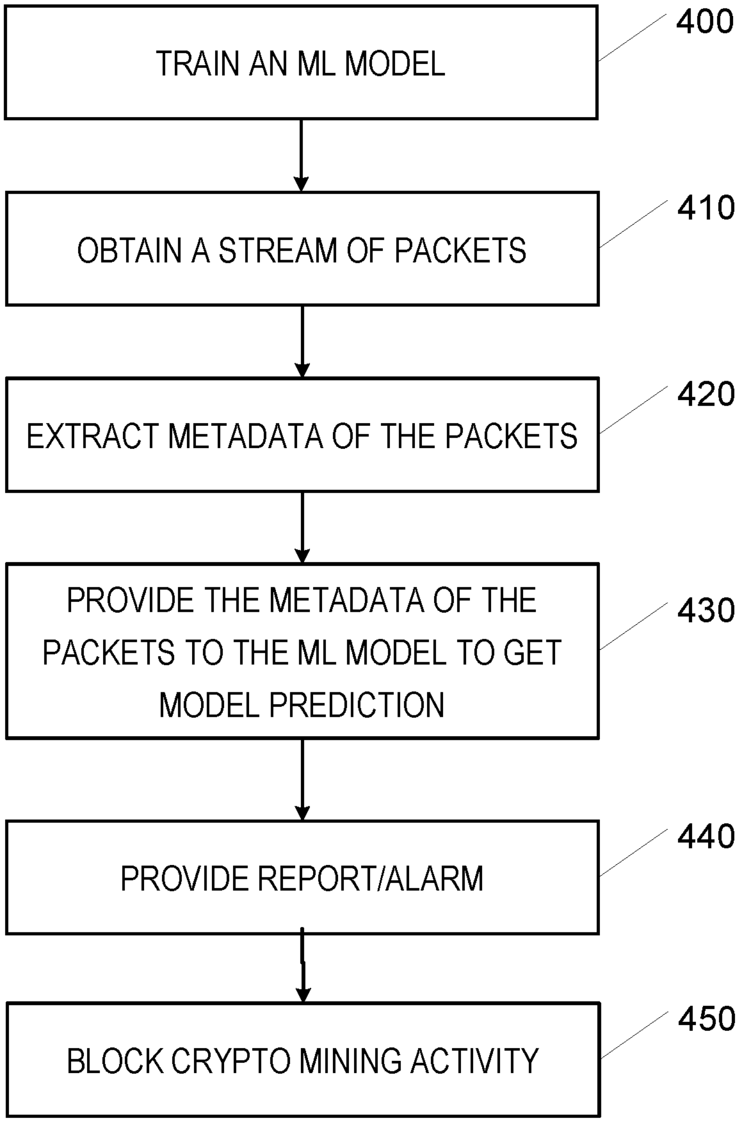
FIG. 4 is a flowchart of a method for detecting crypto mining activity in network traffic in real-time, according to embodiments of the present invention.
Figure 5:
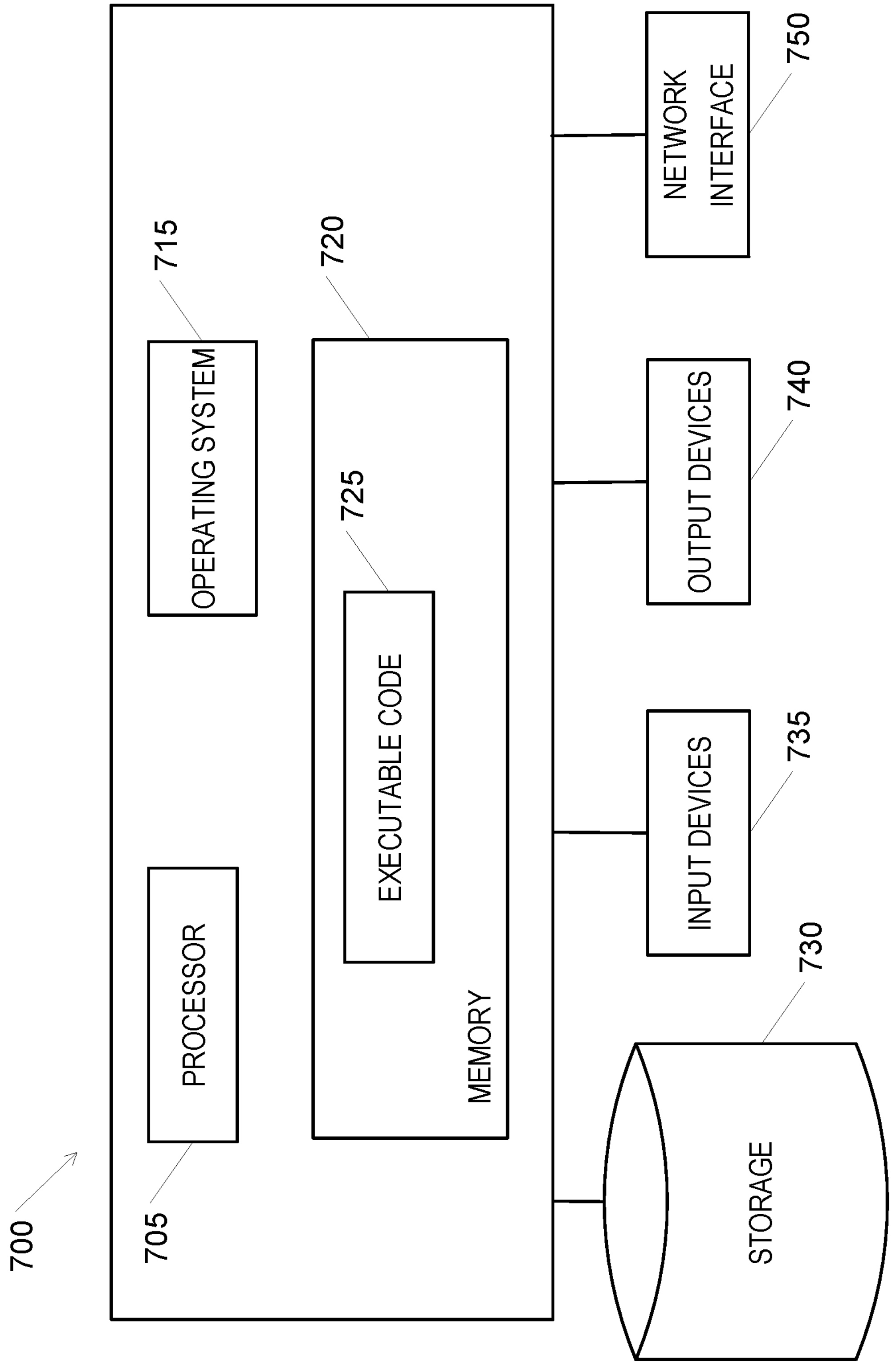
FIG. 5 shows a high-level block diagram of an exemplary computing device which may be used with embodiments of the present invention.

Reference is now made to FIG. 4, which is a flowchart of a method for detecting crypto mining activity in network traffic in real-time, according to embodiments of the invention. While in some embodiments the operations of FIG. 4 are carried out using systems as shown in FIGS. 1, 2 and 5, in other embodiments other systems and equipment can be used.

In operation 400, an ML model may be trained (e.g., by a processor) to detect crypto mining activity in a stream of packets. The ML model may be an RNN, LSTM, GRU, or other type of model. The model may be trained using labeled streams, as disclosed herein.

In operation 410, a processor (e.g., processor 705 depicted in FIG. 5, and/or a processor on DPU 110) may obtain, capture, intercept or receive a stream of packets flowing in a computer network (e.g., the Internet or network 140) between a client and a host (e.g., clients 130, 132 or 134, and host 120). For example, packets may be mirrored and provided to the processor.

In operation 420, the processor may extract the metadata of the packets. For example, the processor may decrypt or analyze the data packets to obtain a header of each data packet, and extract the metadata from the header. The processor may further perform calculation on the metadata to add more features to the metadata, e.g., the processor may calculate the latency between two consecutive packets by subtracting the timestamps of the two packets included in the header. In some embodiments, the processor may organize the metadata of the captured packets in queues, where each queue may include metadata of consecutive packets of a single stream or TCP/IP connection. In some embodiments, the queues may be updated using a FIFO policy.

In operation 430, the processor may determine whether the stream of packets is related to or generated by crypto mining, or not, by providing the metadata of the packets to the trained ML model. An ML model may input the data, and operate on the data, e.g. perform inference, and produce an output, e.g. a classification output or other output. Providing the metadata to the ML model may include providing the metadata of consecutive packets in a single queue. The processor may operate the ML model to classify the stream of packets as related to crypto mining or not. The ML model may provide a determination of whether a certain connection is related to crypto mining, or a probability (or a score related to the probability) that a certain connection is related to crypto mining.

In operation 440, output may be produced. For example, a report and/or an alarm may be provided, e.g., to a human user or system administrator, for example providing an indication that crypto mining is taking place. The report may include information regarding the inspected streams and the streams or connections suspected as including crypto mining activity. An alarm may be provided, e.g., in the form of a push notification, in case crypto mining activity is detected. In operation 450, the processor may block streams that are suspected or classified as related to crypto mining activity, e.g., prevent those packets from reaching the host (e.g., host 120).

FIG. 5 shows a high-level block diagram of an exemplary computing device which may be used with embodiments of the present invention. Computing device 700 may include a controller or processor 705 that may be or include, for example, one or more central processing unit processor(s) (CPU), one or more Graphics Processing Unit(s) (GPU), a chip or any suitable computing or computational device, an operating system 715, a memory 720, a storage 730, input devices 735 and output devices 740. Each of modules and equipment such as clients 130, 132, 134, host 120 and DPU 110, as shown in FIG. 1 and other modules or equipment mentioned herein may be or include, or may be executed by, a computing device such as included in FIG. 5 or specific components of FIG. 5, although various units among these entities may be combined into one computing device.

Operating system 715 may be or may include any code segment designed and/or configured to perform tasks involving coordination, scheduling, supervising, controlling or otherwise managing operation of computing device 700, for example, scheduling execution of programs. Memory 720 may be or may include, for example, a Random Access Memory (RAM), a read only memory (ROM), a Dynamic RAM (DRAM), a volatile memory, a non-volatile memory, a cache memory, or other suitable memory units or storage units. Memory 720 may be or may include a plurality of possibly different memory units. Memory 720 may store for example, instructions to carry out a method (e.g. code 725), and/or data such as model weights, etc.

Executable code 725 may be any executable code, e.g., an application, a program, a process, task or script. Executable code 725 may be executed by processor 705 possibly under control of operating system 715. For example, executable code 725 may when executed carry out methods according to embodiments of the present invention. For the various modules and functions described herein, one or more computing devices 700 or components of computing device 700 may be used. One or more processor(s) 705 may be configured to carry out embodiments of the present invention by for example executing software or code.

Storage 730 may be or may include, for example, a hard disk drive, a floppy disk drive, a Compact Disk (CD) drive, or other suitable removable and/or fixed storage unit. Data such as instructions, code, telemetry data, etc. may be stored in a storage 730 and may be loaded from storage 730 into a memory 720 where it may be processed by processor 705. Some of the components shown in FIG. 5 may be omitted.

Input devices 735 may be or may include for example a mouse, a keyboard, a touch screen or pad or any suitable input device. Any suitable number of input devices may be operatively connected to computing device 700 as shown by block 735. Output devices 740 may include displays, speakers and/or any other suitable output devices. Any suitable number of output devices may be operatively connected to computing device 700 as shown by block 740. Any applicable input/output (I/O) devices may be connected to computing device 700, for example, a modem, printer or facsimile machine, a universal serial bus (USB) device or external hard drive may be included in input devices 735 or output devices 740. Network interface 750 may enable device 700 to communicate with one or more other computers or networks. For example, network interface 750 may include a wired or wireless NIC.

Embodiments of the invention may include one or more article(s) (e.g. memory 720 or storage 730) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention may be embodied in other specific forms using other details without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein. In some cases well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" can include, for example, "multiple" or "two or more". The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for blocking streams related to crypto mining, the method comprising, using a processor:

obtaining a plurality of packets from a plurality of clients;

extracting metadata of the packets, wherein, for each of the packets, the metadata is selected from the list consisting of: source Internet protocol (IP) address and port, destination IP address and port, packet size, packet direction, a timestamp, and at least one Transmission Control Protocol (TCP) flag of the packet;

organizing the metadata of the plurality of packets in queues based on the metadata, wherein each queue comprises metadata of packets of a single stream, wherein the packets in each queue are organized in consecutive order based on the timestamp of the packets included in the metadata;

for each queue, operating a machine learning (ML) model, which has been trained to detect patterns related to crypto mining activity, on the metadata of consecutive packets in the queue to determine whether the packets are related to crypto mining; and blocking streams that are determined as related to crypto mining.

2. The method of claim 1, further comprising:

training the ML model to detect crypto mining by providing the ML model with training streams of packets, each labeled as related to crypto mining or not related to crypto mining.

3. The method of claim 1, wherein the stream comprises a sequence of consecutive packets of a Transmission Control Protocol (TCP)/Internet protocol (IP) connection.

4. The method of claim 1, wherein the ML model comprises a neural network (NN).

5. The method of claim 1, wherein the ML model comprises a long short-term memory (LSTM) neural network (NN).

6. The method of claim 1, wherein the at least one TCP flag is selected from the list consisting of: Synchronization (SYN), Acknowledgement (ACK), Finish (FIN), Reset (RST), Push (PSH) and Urgent (URG).

7. The method of claim 1, wherein obtaining the group of packets comprises mirroring a plurality of packets flowing in a computer network.

8. The method of claim 1, wherein the queues are updated using a first-in-first-out (FIFO) policy.

9. The method of claim 1, comprising providing a report of the packets that are related to crypto mining.

10. A method for blocking flows related to crypto mining activity in a computer network, the method comprising:

mirroring a plurality of packets flowing in the computer network from a plurality of clients;

extracting features of each of the plurality of packets, wherein, for each of the packets, the metadata is selected from the list consisting of: source Internet protocol (IP) address and port, destination IP address and port, packet size, packet direction, a timestamp, and at least one Transmission Control Protocol (TCP) flag of the packet;

organizing the features of the plurality of packets in flows based on the features wherein each flow comprises features of packets of a single stream, wherein the packets in each queue are organized in consecutive order based on the timestamp of the packets included in the metadata; and for each flow, operating a machine learning (ML) model, which has been trained to detect patterns related to crypto mining activity, on the features of consecutive packets in the flow to detect the crypto mining activity; and blocking flows that are detected as related to crypto mining.

11. The method of claim 10, further comprising:

training the ML model to detect crypto mining by providing the ML model with training streams of packets, each labeled as related to crypto mining or not related to crypto mining.

12. The method of claim 10, wherein the ML model comprises a long short-term memory (LSTM) neural network (NN).

13. The method of claim 10, wherein the at least one TCP flag is selected from the list consisting of: Synchronization (SYN), Acknowledgement (ACK), Finish (FIN), Reset (RST), Push (PSH) and Urgent (URG).

14. The method of claim 10, wherein the queues are updated using a first-in-first-out (FIFO) policy.

15. A system for blocking streams related to crypto mining, the system comprising:

a memory; and a processor configured to:

obtain a plurality of packets from a plurality of clients;

extract metadata of the packets, wherein, for each of the packets, the metadata is selected from the list consisting of: source Internet protocol (IP) address and port, destination IP address and port, packet size, packet direction, and at least one Transmission Control Protocol (TCP) flag of the packet;

organize the metadata of the plurality of packets in queues based on the metadata, wherein each queue comprises metadata of packets of a single stream, wherein the packets in each queue are organized in consecutive order based on the timestamp of the packets included in the metadata;

for each queue, operate a machine learning (ML) model, which has been trained to detect patterns related to crypto mining activity, on the metadata of consecutive packets in the queue to determine whether the packets are related to crypto mining; and block streams that are determined as related to crypto mining.

16. The system of claim 15, wherein the stream of packets comprises a sequence of consecutive packets of a Transmission Control Protocol (TCP)/Internet protocol (IP) connection.

17. The system of claim 15, wherein the ML model comprises a neural network (NN).

18. The system of claim 15, wherein the ML model comprises a long short-term memory (LSTM) neural network (NN).

19. The system of claim 15, wherein the processor is further to mirror a plurality of packets flowing in a computer network.

20. The system of claim 15, wherein the system comprises:

a host; and a data processing unit (DPU) to connect the host to a computer network, wherein the DPU comprises the memory and the processor.

* * * * *